US012331765B2

(12) United States Patent
Kral et al.

(10) Patent No.: US 12,331,765 B2
(45) Date of Patent: Jun. 17, 2025

(54) PNEUMATIC ACTUATING ELEMENT, EXHAUST AIR SYSTEM, HOUSING HAVING AN EXHAUST AIR SYSTEM, PNEUMATIC ACTUATOR

(71) Applicant: KNORR-BREMSE Systeme fuer Nutzfahrzeuge GmbH, Munich (DE)

(72) Inventors: Martin Kral, Munich (DE); Daniel Geis-Esser, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 850 days.

(21) Appl. No.: 17/274,013

(22) PCT Filed: Aug. 2, 2019

(86) PCT No.: PCT/EP2019/070902
§ 371 (c)(1),
(2) Date: Mar. 5, 2021

(87) PCT Pub. No.: WO2020/048700
PCT Pub. Date: Mar. 12, 2020

(65) Prior Publication Data

US 2021/0317852 A1 Oct. 14, 2021

(30) Foreign Application Priority Data

Sep. 7, 2018 (DE) ..................... 10 2018 215 300.0

(51) Int. Cl.
*F15B 21/048* (2019.01)

(52) U.S. Cl.
CPC ..... *F15B 21/048* (2013.01); *F15B 2211/5156* (2013.01); *F15B 2211/5157* (2013.01); *F15B 2211/5159* (2013.01)

(58) Field of Classification Search
CPC ............ F15B 21/048; F15B 2211/5156; F15B 2211/5157; F15B 2211/5159; F16H 61/30
See application file for complete search history.

(56) References Cited

U.S. PATENT DOCUMENTS 2,336,715 A 11/1933 Casler et al.
3,053,102 A * 9/1962 Alfieri .................... F16H 61/30
74/473.11

(Continued)

FOREIGN PATENT DOCUMENTS

CN 2599439 Y 1/2004
CN 202243952 U 5/2012

(Continued)

OTHER PUBLICATIONS

Japanese-language Office Action issued in Japanese Application No. 2021-512619 dated Jan. 24, 2022 with English translation (12 pages).

(Continued)

*Primary Examiner* — Patrick C Williams
(74) *Attorney, Agent, or Firm* — Crowell & Moring LLP

(57) ABSTRACT

A pneumatic actuating element, an exhaust air system, a housing, and a pneumatic actuator, are provided, which are designed to provide a possibility to collect exhaust air that is discharged when the pneumatic actuating element is ventilated, which exhaust air typically includes contaminations, and to release the exhaust air in an area that is not visible during operation, in order to prevent irritation due to a contaminated housing on the one hand and, on the other hand, to protect components that might come into contact with the contaminated exhaust air.

9 Claims, 2 Drawing Sheets

(56) References Cited

U.S. PATENT DOCUMENTS

| | | | | |
|---|---|---|---|---|
| 4,358,988 | A | 11/1982 | Gali Mallofre | |
| 4,522,220 | A * | 6/1985 | Multrus | F15C 5/00 92/97 |
| 4,610,270 | A * | 9/1986 | Acker | F16K 11/0716 137/625.68 |
| 4,646,870 | A * | 3/1987 | Koch | F16H 61/0248 180/336 |
| 5,595,209 | A * | 1/1997 | Atkinson | G05D 16/0672 251/117 |
| 8,671,986 | B2 * | 3/2014 | Tanino | E02F 9/226 137/625.69 |
| 2004/0145237 | A1 * | 7/2004 | Duchet | F15B 13/0832 303/127 |
| 2007/0119298 | A1 | 5/2007 | Steinborn et al. | |
| 2008/0006114 | A1 * | 1/2008 | Reul | F15B 15/1452 74/473.11 |
| 2010/0016712 | A1 | 1/2010 | Bartal et al. | |
| 2012/0031273 | A1 | 2/2012 | Heer | |
| 2014/0124323 | A1 * | 5/2014 | Heubner | F15B 11/122 192/85.01 |
| 2018/0320716 | A1 | 11/2018 | Reidi et al. | |
| 2019/0030976 | A1 | 1/2019 | Bodet et al. | |

FOREIGN PATENT DOCUMENTS

| | | | |
|---|---|---|---|
| DE | 100 29 497 | A1 | 1/2002 |
| DE | 10 2004 006 683 | A1 | 9/2005 |
| DE | 10 2007 009 764 | A1 | 8/2008 |
| DE | 10 2007 009 767 | A1 | 8/2008 |
| DE | 10 2008 040 669 | A1 | 6/2010 |
| DE | 10 2010 031 306 | A1 | 1/2012 |
| DE | 10 2014 009 432 | A1 | 12/2015 |
| DE | 10 2015 118 744 | A1 | 5/2017 |
| DE | 10 2016 004 366 | A1 | 10/2017 |
| EP | 1 290 362 | B1 | 8/2003 |
| JP | 55-20756 | U | 2/1980 |
| JP | 55-126193 | A | 9/1980 |
| JP | 60-29039 | B2 | 7/1985 |
| JP | 7-332485 | A | 12/1995 |
| JP | 2009-127563 | A | 6/2009 |
| JP | 2009-127663 | A | 6/2009 |
| RU | 2 230 998 | C1 | 6/2004 |
| RU | 2 284 436 | C1 | 9/2006 |
| RU | 2 285 868 | C1 | 10/2006 |
| WO | WO 2016/026577 | A1 | 2/2016 |

OTHER PUBLICATIONS

Japanese-language Office Action issued in Japanese Application No. 2021-512619 dated Aug. 16, 2022 with English translation (10 pages).

Korean-language Office Action issued in Korean Application No. 10-2021-7010075 dated Jun. 26, 2023 with English translation (7 pages).

Korean-language Office Action issued in Korean Application No. 10-2021-7010075 dated Sep. 30, 2022 with English translation (eight (8) pages).

Chinese-language Office Action issued in Chinese Application No. 201980058021.X dated Jan. 10, 2023 with English translation (11 pages).

International Preliminary Report on Patentability (PCT/IB/326 & PCT/IB/373) issued in PCT Application No. PCT/EP2019/070902 dated Mar. 18, 2021, Including English translation of document C2 (German-language Written Opinion (PCT/ISA/237), filed on Mar. 5, 2021) (11 pages).

Japanese-language Office Action issued in Japanese Application No. 2021-512619 dated Jan. 24, 2023 with English translation (12 pages).

Russian-language Office Action issued in Russian Application No. 2021109409/12(020234) dated Nov. 17, 2021 with partial English translation (14 pages).

Australian Office Action issued in Australian Application No. 2019334152 dated Aug. 2, 2022 (six (6) pages).

International Search Report (PCT/ISA/210) issued in PCT Application No. PCT/EP2019/070902 dated Nov. 6, 2019 with English translation (five (5) pages).

German-language Written Opinion (PCT/ISA/237) issued in PCT Application No. PCT/EP2019/070902 dated Nov. 6, 2019 (seven (7) pages).

German-language Office Action issued in German Application No. 10 2018 215 300.0 dated Jun. 6, 2019 (six (6) pages).

Spanish-language Office Action issued in Mexican Application No. MX/a/2021/002650 dated May 29, 2024 (7 pages).

* cited by examiner

AT

Prior art

PNEUMATIC ACTUATING ELEMENT, EXHAUST AIR SYSTEM, HOUSING HAVING AN EXHAUST AIR SYSTEM, PNEUMATIC ACTUATOR

BACKGROUND AND SUMMARY OF THE INVENTION

The present invention concerns a pneumatic actuating element, an exhaust air system, a housing, and a pneumatic actuator which is preferably configured as a pneumatic gearbox actuator.

Modern pneumatic actuators, in particular pneumatic gearbox actuators, have actuating elements which set a desired working pressure in order to load a pressure chamber of the actuator with this working pressure. When the working pressure is to be dissipated again, the pressure chamber is vented. Venting takes place inside a housing containing the corresponding actuating element.

Since the exhaust air usually contains contaminants such as particles, water or oil, components also provided in the housing, such as electronic circuit boards, may suffer damage from deposits, soiling or corrosion, or the external appearance may suffer due to a dirty oil film around the outlet.

It is therefore the object of the present invention to design the venting for pneumatic actuators, in particular pneumatic gearbox actuators, so as to avoid the problem described above.

This object is achieved by the subjects of the independent claims. Advantageous refinements are the subject of the subclaims.

According to the invention, a pneumatic actuating element is provided, which is configured to influence a required working pressure starting from a pressure of a compressed air supply that may be connected to the actuating element, and which is configured to be connected to an exhaust air line in order to emit exhaust air, that is discharged from the actuating element to reduce the working pressure, to the exhaust air line. A pneumatic actuating element is thus essential to fulfil the function of a pneumatic actuator. The preferred design of a port on the actuating element, to which the exhaust air line can be connected, allows simple mounting of the exhaust air line on the actuating element.

The compressed air supply is preferably configured as a compressed air accumulator.

Alternatively or additionally, the pneumatic actuating element is preferably configured as a pneumatic actuating element in a gearbox actuator. This requires the actuating element to be designed preferably robustly against environmental influences, such as for example temperature fluctuations, since during operation of a truck, these may easily lie in the range from −40° C. to +120° C., wherein an insulated housing in which the actuating element is arranged is not necessarily present.

The actuating element is in particular configured as a magnetic valve, diaphragm valve, piston valve, slide valve, and/or relay valve. Further variants are also conceivable.

Advantageously, the actuating element is configured to be connected to an exhaust air line.

The actuating element is furthermore preferably configured to be provided in a housing, particularly preferably in a housing of a gearbox actuator. For this, it preferably comprises elements which are configured to form a connection with fixing means of the housing or separate fixing means and the housing in order to fix the actuating element in the housing.

According to the invention, furthermore an exhaust air system is provided that has at least one exhaust air line which is configured to be connected to a pneumatic actuating element in order to receive exhaust air that is discharged from the actuating element to reduce the working pressure. The exhaust air system may preferably be configured to combine several exhaust air lines into one line in order to conduct the exhaust air further in targeted fashion.

Preferably, the at least one exhaust air line at least in portions is made of a flexible or elastic material such as rubber. In this way, the exhaust air line is less susceptible to vibrations which may occur during operation of a pneumatic actuator. Alternatively or additionally, the at least one exhaust air line may also be configured at least in portions so as to be rigid, for example made of steel.

The exhaust air system is preferably configured to be provided inside a housing, wherein the exhaust air system is furthermore preferably made at least from parts of the housing.

The exhaust air system preferably comprises elements which are configured to form a connection with fixing means of the housing or separate fixing means and the housing in order to fix the actuating element in the housing.

The exhaust air line is preferably not necessarily formed as a line. It may also at least partly be designed as a separate volume into which preferably several actuating elements vent.

Preferably, the exhaust air system has an outlet which is configured to discharge the received exhaust air into a vent device or to atmosphere. Alternatively, the exhaust air system is configured to be connected to such an outlet. This creates a possibility of discharging the exhaust air collectively.

The outlet of the exhaust air system is preferably configured as a port which is designed to conduct the received exhaust air further via a line. The line is preferably fluidically connected to the port. The line is furthermore preferably configured to conduct the received exhaust air outside a housing in which the exhaust air system receives the exhaust air. Further preferably, this line is configured to carry out a final discharge of the exhaust air remotely from the housing.

The exhaust air is preferably discharged via a silencer, irrespective of whether or not the outlet is connected to a further line.

A vent device may here be a separate chamber which is designed to collect the exhaust air.

Alternatively or additionally, the exhaust air system is preferably configured as an exhaust air system in a gearbox actuator. This requires the exhaust air system to be designed preferably robustly against environmental influences, such as for example temperature fluctuations, since during operation in a gearbox actuating element or gearbox actuator of a truck, these may easily lie in the range from −40° C. to +120° C., wherein an insulated housing in which the exhaust air system is preferably arranged is not necessarily present. Thus for example, it must be ensured that the exhaust air system does not lose its function ability because of environmental influences. In particular, it must be ensured that the exhaust air system can perform temperature-induced length changes without separation of connecting points, such as for example the connecting points to the pneumatic actuating elements described above.

According to the invention, furthermore a housing is provided which is configured to receive a pneumatic operating element, wherein the housing is furthermore configured to receive at least one pneumatic actuating element as described above, and an exhaust air system as described above.

Particularly preferably, the housing has elements which are configured to form a connection with fixing means of the actuating element, the exhaust air system and/or operating means, or separate fixing means and the actuating element, the exhaust air system or the operating means, in order to fix the actuating element in the housing.

Preferably, the housing has at least one pneumatic actuating element as described above and an exhaust air system as described above, wherein the actuating element and the exhaust air system are fluidically connected together, in particular to collect the exhaust air from the actuating element. In this way, the housing is designed to generate working pressures and collect the exhaust air of at least one pneumatic actuating element through the exhaust air system.

Alternatively or additionally, the housing has an outlet which is fluidically connected to the exhaust air system and is configured to discharge the exhaust air to a purge device or to atmosphere. Thus a central outlet is created for discharging the exhaust air collected by the exhaust air system from the housing using the exhaust air system.

An outlet which is designed to be connected to the exhaust air system advantageously avoids the problem of contaminants, such as particles, water or oil which may be contained in the exhaust air, being deposited on and damaging components inside the housing.

Preferably, the outlet of the housing and the outlet of the exhaust air system are identical with each other or at least fluidically connected to one another.

Alternatively or additionally, the housing has a port for connection to a compressed air supply, preferably a compressed air accumulator, wherein the at least one pneumatic actuating element is connected to the port. This creates the possibility of conducting the required compressed air for generating the working pressure to the pneumatic actuating element inside the housing.

If the exhaust air is furthermore discharged from the housing at any arbitrary region, it is possible that the contaminants, in particular oil, will settle externally on the housing. An oil film may be created which may additionally absorb dust and particles from the environment, leading to visible soiling on the housing which may be erroneously interpreted as an indicator of a leak on the housing. Thus such soiling at least reduces or fully destroys the user's confidence in the function ability of this pneumatic actuator. Also the user is then led to unnecessarily visit a workshop for elimination of the presumed leak.

The outlet is preferably arranged on the housing such that it is not visible when the housing is installed and/or when the housing is in use, and/or the outlet is arranged and configured to discharge the exhaust air in a non-visible region. This advantageously ensures that no soiling, such as particles, water or oil which may be contained in the exhaust air, leaves a visible film on the housing, thus avoiding the problem of the user incorrectly suspecting a leak from the housing.

The outlet of the housing is preferably configured as a port which is designed to conduct the received exhaust air further via a line. The line is preferably fluidically connected to the port. The line is furthermore preferably configured to discharge the received exhaust air remotely from the housing. Further preferably, this line is configured to carry out a final discharge of the exhaust air remotely from the housing.

The exhaust air is preferably discharged via a silencer, irrespective of whether or not the outlet is connected to a further line.

Alternatively or additionally, the housing is preferably configured as a housing of the gearbox actuator. This requires the housing to be designed preferably robustly against environmental influences, dust or moisture. The housing is thus preferably sealed against the environment, wherein existing interfaces such as inlets and outlets are preferably provided with filter devices against these environmental influences.

Furthermore, according to the invention, a pneumatic actuator is provided comprising:

- at least one pneumatic actuating element as described above,
- at least one exhaust air system as described above, wherein the exhaust air system is fluidically connected to the actuating element,
- a housing as described above, and
- at least one pneumatic operating element which is configured to be loaded with working pressure by the pneumatic actuating element and vented again.

Preferably, at least the at least one pneumatic actuating element, the at least one exhaust air system or the at least one pneumatic operating element, is arranged inside the housing.

The pneumatic operating element may be configured in various respects. A preferred embodiment provides the configuration for operating a gearbox. Preferably, thus the at least one pneumatic operating element is configured to operate selection elements of a gearbox, in particular a selector sleeve gearbox.

The pneumatic gearbox actuator configured in this way is preferably designed for use in a truck.

The at least one pneumatic operating element is preferably designed as a shift finger which is configured to carry out a gear and gate change in the gearbox. The movements of the shift finger required for this are finally provoked pneumatically by the working pressures generated by the at least one actuating element, so that the shift finger can be brought into engagement with the corresponding selection elements of the gearbox and finally move these for engaging or disengaging a gear.

A gearbox actuator according to the invention, in particular in a truck in which the gearbox is often placed visibly behind the driver's cab, has the advantage that components in the interior of the housing are not damaged from contamination of the exhaust air.

If also the outlet is arranged accordingly non-visibly, the advantage is also achieved that no soiling as described above occurs on the visible exterior. In this way, the number of unnecessary workshop visits of the truck is reduced and its efficiency increased.

Preferred embodiments of the invention are described below with reference to the appended drawings.

DETAILED DESCRIPTION OF THE DRAWINGS

Figure 1:
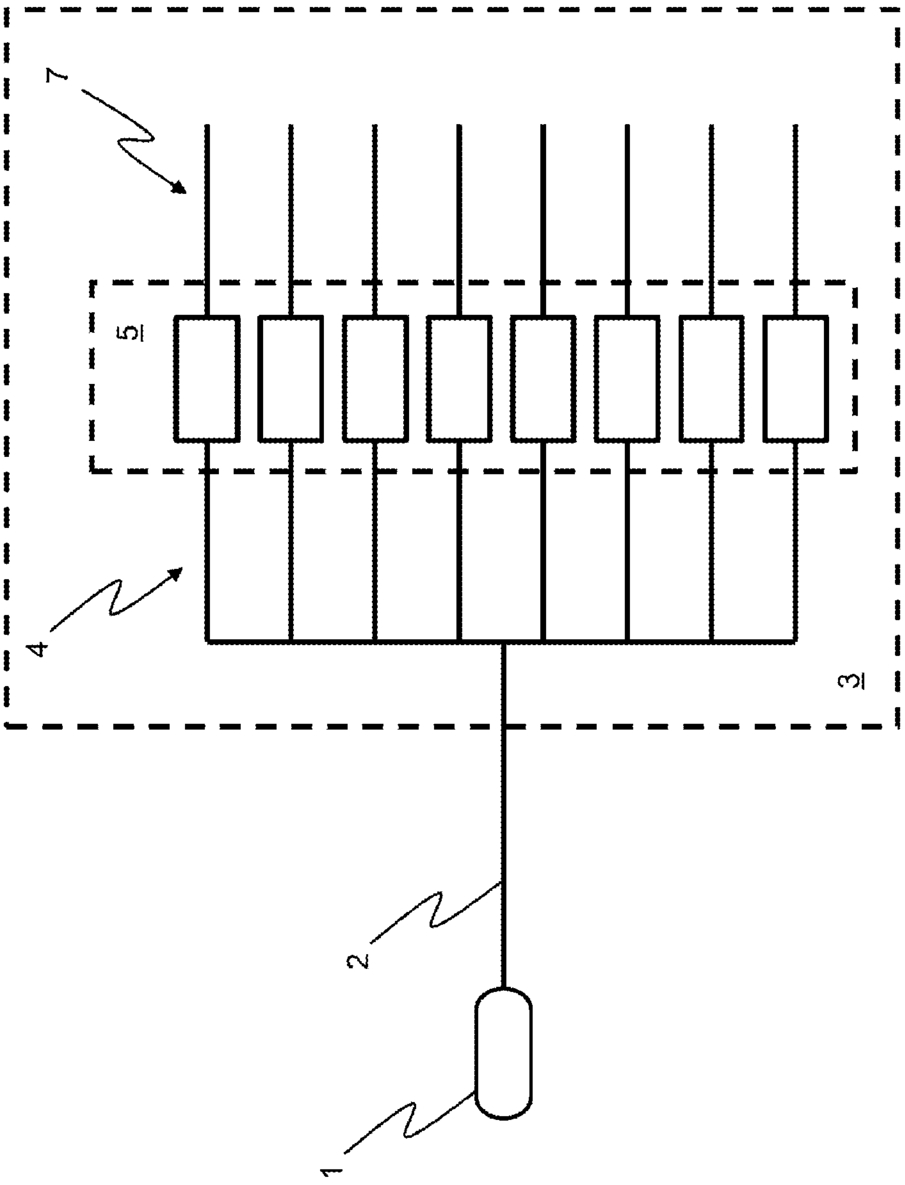
FIG. 1 is a general view of a housing of a pneumatic actuator with general paths of supply lines to the pneumatic actuating elements according to the prior art.

FIG. 1 shows a general view of a housing 3 of a pneumatic actuator with the general paths of supply lines 4 to pneumatic actuating elements 5 according to the prior art.

A compressed air supply is shown in the form of an optional compressed air accumulator 1 which is fluidically in contact with the housing 3 by means of a pressure line 2 which branches into supply lines 4 inside the housing 3. The supply lines 4 are fluidically connected to pneumatic actuating elements 5, which are configured for example as magnetic valves.

The actuating elements 5 are designed to set a working pressure from the pressure introduced from the compressed air accumulator 1 via the pressure line 2 and the supply lines 4, in order then to feed the pneumatic pressure chambers (not shown) from the actuating elements 5, so as for example to move an operating element (not shown) of an actuator, in particular a gearbox actuator.

The actuating elements 5 discharge exhaust air from the pneumatic pressure chambers into the interior of the housing 3, in this embodiment via separate outlets 7, in order to further reduce the pressure in the pressure chambers. Because of contamination with particles, water or oil, which may be contained in the exhaust air from the actuating elements 5, elements such as electronic circuit boards inside the housing 3 are at risk.

Figure 2:
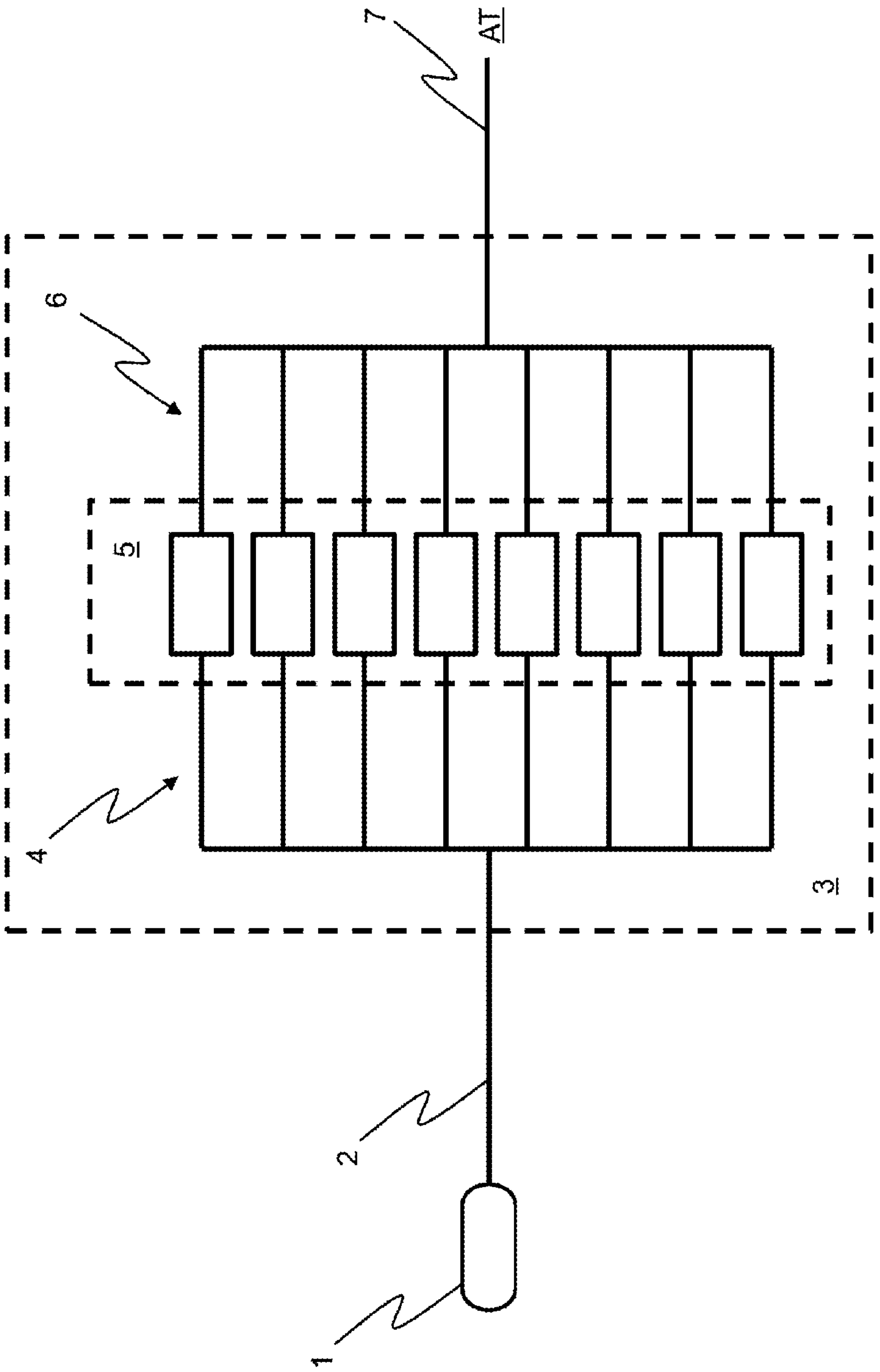
FIG. 2 is an extension according to the invention of the arrangement from FIG. 1.

FIG. 2 therefore shows a refinement according to the invention of the embodiment in FIG. 1.

In the configuration shown, exhaust air lines 6 adjoin the actuating elements 5 on the right. Each exhaust air line 6 is connected to a separate actuating element 5. The exhaust air lines 6 are configured to receive the exhaust air from the actuating elements 5. For this, the exhaust air lines 6 are fluidically connected to the actuating elements 5.

The exhaust air lines 6 finally merge inside the housing 3 and open into a common outlet 7, which is here configured as an outlet line and discharges the exhaust air from the actuator elements 5 to atmosphere AT.

Thus it may be ensured that the exhaust air is not discharged into the housing 3, so that elements such as electronic circuit boards inside the housing 3 are not endangered by the contaminated exhaust air.

The exhaust air lines 6 and the outlet 7 here form an exhaust air system which is configured to discharge the exhaust air from the housing 3.

The outlet 7 is placed on the housing 3 such that the discharged exhaust air, or the region into which the exhaust air is discharged, and/or the outlet 7, are not themselves visible from the outside to a user. This ensures that no soiling occurs in a visible region on the housing 3. This may thereby avoid an erroneous assumption of an unsealed housing 3.

The invention is not restricted to the embodiment described herein. Further embodiments according to the invention may be achieved by the omission of individual elements or by the replacement of individual elements with elements of similar function.

For example, instead of the individual exhaust air lines 6, a separate volume distinct from the housing 3 may be provided, into which the actuating elements 5 vent and from which finally venting takes place at the outlet 7.

The outlet 7 may furthermore, as described above, be provided directly on the housing or be configured as a port, wherein this port is designed to be connected to a line in order to conduct the exhaust air in targeted fashion to a desired location and discharge it there. The desired location may here be provided at a site, for example on a truck, which is not visible in normal operation (i.e. when the housing is installed). This is advantageous above all if it is not possible to arrange the housing 3 with a non-visible outlet 7 on the housing 3.

Furthermore, the outlet 7 may have a silencer (not shown) which is configured to acoustically deaden a discharge of exhaust air.

LIST OF REFERENCE SIGNS

1 Compressed air accumulator
2 Compressed air line
3 Housing
4 Supply line
5 Actuating elements
6 Exhaust air line
7 Outlet
AT Atmosphere

What is claimed is:

1. A pneumatic actuator, comprising:

at least one pneumatic actuating element which is configured to influence a required working pressure starting from a pressure of a compressed air supply that is connectable to the pneumatic actuating element, wherein the pneumatic actuating element is connected to an exhaust air line of an exhaust air system in order to emit exhaust air, that is discharged from the actuating element to reduce the working pressure, to the exhaust air line, wherein the exhaust air line is in fluid communication with atmosphere;

a housing;

at least one pneumatic operating element which is configured to be loaded with the working pressure by the pneumatic actuating element and vented again by the pneumatic actuating element, wherein the at least one pneumatic actuating element, the exhaust air system, or the at least one pneumatic operating element, is arranged inside the housing, and the at least one pneumatic operating element is configured to operate selection elements of a gearbox.

2. The pneumatic actuator as claimed in claim 1, wherein the pneumatic actuating element is configured as a:

magnetic valve,
diaphragm valve,
piston valve,
slide valve,
relay valve, or
as an actuating element for a pneumatic gearbox actuator.

3. The pneumatic actuator as claimed in claim 1, wherein at least one of:

at least two exhaust air lines are merged into one line, the at least one exhaust air line has flexible or rigid portions, or the exhaust air system is configured to be provided in a pneumatic gearbox actuator.

4. The pneumatic actuator as claimed in claim 1, wherein the exhaust air system has an outlet which is configured to discharge the received exhaust air into a vent device or to the atmosphere, or the exhaust air system is configured to be connected to said outlet.

5. The pneumatic actuator as claimed in claim 4, wherein the outlet of the exhaust air system is configured as a port which is designed to conduct the received exhaust air further via a line, and the line is configured to conduct the received exhaust air outside a housing in which the exhaust air system receives the exhaust air.

6. The pneumatic actuator as claimed in claim 1, wherein the housing contains the at least one pneumatic actuating element and the exhaust air system, wherein at least one of:

the pneumatic actuating element and the exhaust air system are fluidically connected together, the housing has an outlet which is fluidically connected to the exhaust air system and is configured to discharge the exhaust air to a purge device or to atmosphere, or the housing has a port for connection to the compressed air supply, wherein the at least one pneumatic actuating element is connected to the port.

7. The pneumatic actuator as claimed in claim 6, wherein at least one of:

the outlet is arranged on the housing so as not to be visible when the housing is installed and/or when the housing is in use, the outlet is arranged and configured to discharge the exhaust air in a non-visible region, or the housing is a pneumatic gearbox actuator housing.

8. The pneumatic actuator as claimed in claim 6, wherein the outlet of the housing is configured as a port which is designed to conduct the received exhaust air further via a line, wherein the further line is configured to conduct the received exhaust air outside the housing in which the exhaust air system receives the exhaust air.

9. The pneumatic actuator as claimed in claim 1, wherein the gearbox is a selector sleeve gearbox.

* * * * *